United States Patent [19]

Dembosky

[11] Patent Number: 5,643,117
[45] Date of Patent: Jul. 1, 1997

[54] HYDRAULIC TENSIONER WITH CHECK VALVE VENT

[75] Inventor: Stanley K. Dembosky, Ithaca, N.Y.

[73] Assignee: Borg-Warner Automotive, Inc., Sterling Heights, Mich.

[21] Appl. No.: 569,729

[22] Filed: Dec. 8, 1995

[51] Int. Cl.$^6$ .................................................. F16H 7/08
[52] U.S. Cl. .......................................... 474/110; 474/138
[58] Field of Search ................................ 474/101, 103, 474/110, 138

[56] References Cited

U.S. PATENT DOCUMENTS

| 4,504,251 | 3/1985 | Mittermeier | 474/110 |
|---|---|---|---|
| 4,507,103 | 3/1985 | Mittermeier | 474/110 |
| 4,708,696 | 11/1987 | Kimura et al. | 474/103 |
| 4,741,299 | 5/1988 | Matsuura et al. | 474/110 X |
| 4,826,470 | 5/1989 | Breon et al. | 474/110 |
| 4,874,352 | 10/1989 | Suzuki | 474/110 |
| 4,881,927 | 11/1989 | Suzuki | 474/110 |
| 4,963,121 | 10/1990 | Himura et al. | 474/110 |
| 4,981,460 | 1/1991 | Ojima | 474/111 |
| 5,087,225 | 2/1992 | Futami et al. | 474/110 X |
| 5,167,402 | 12/1992 | Nakakubo et al. | 474/110 X |
| 5,181,889 | 1/1993 | Maruyama et al. | 474/110 |
| 5,248,282 | 9/1993 | Suzuki | 474/110 |
| 5,259,820 | 11/1993 | Mott | 474/110 |
| 5,277,664 | 1/1994 | Mott | 474/110 |
| 5,310,385 | 5/1994 | Suzuki | 474/110 |
| 5,314,388 | 5/1994 | Suzuki et al. | 474/110 |
| 5,346,436 | 9/1994 | Hunter et al. | 474/110 |
| 5,352,159 | 10/1994 | Suzuki et al. | 474/110 |
| 5,366,417 | 11/1994 | Shimaya | 474/138 X |
| 5,370,584 | 12/1994 | Todd | 474/110 |
| 5,405,298 | 4/1995 | Bristot | 474/136 |

*Primary Examiner*—Roger J. Schoeppel
*Attorney, Agent, or Firm*—Hugh A. Abrams, Esq.; Greg Dziegielewski, Esq.

[57] ABSTRACT

A hydraulic chain tensioner has a check valve vent. The tensioner includes a housing having a bore with a fluid filled chamber, a hollow piston slidably received within the bore and biased in a protruding direction by a spring, and a check valve assembly which permits fluid to flow from an external source through the valve and into the fluid filled chamber. The vent includes a disc positioned against the inlet from the external source of fluid. The disc has at least one channel formed on the surface of the disc facing the external source. The channel has a first end at the periphery of the disc and a second end at the center point of the disc.

10 Claims, 3 Drawing Sheets

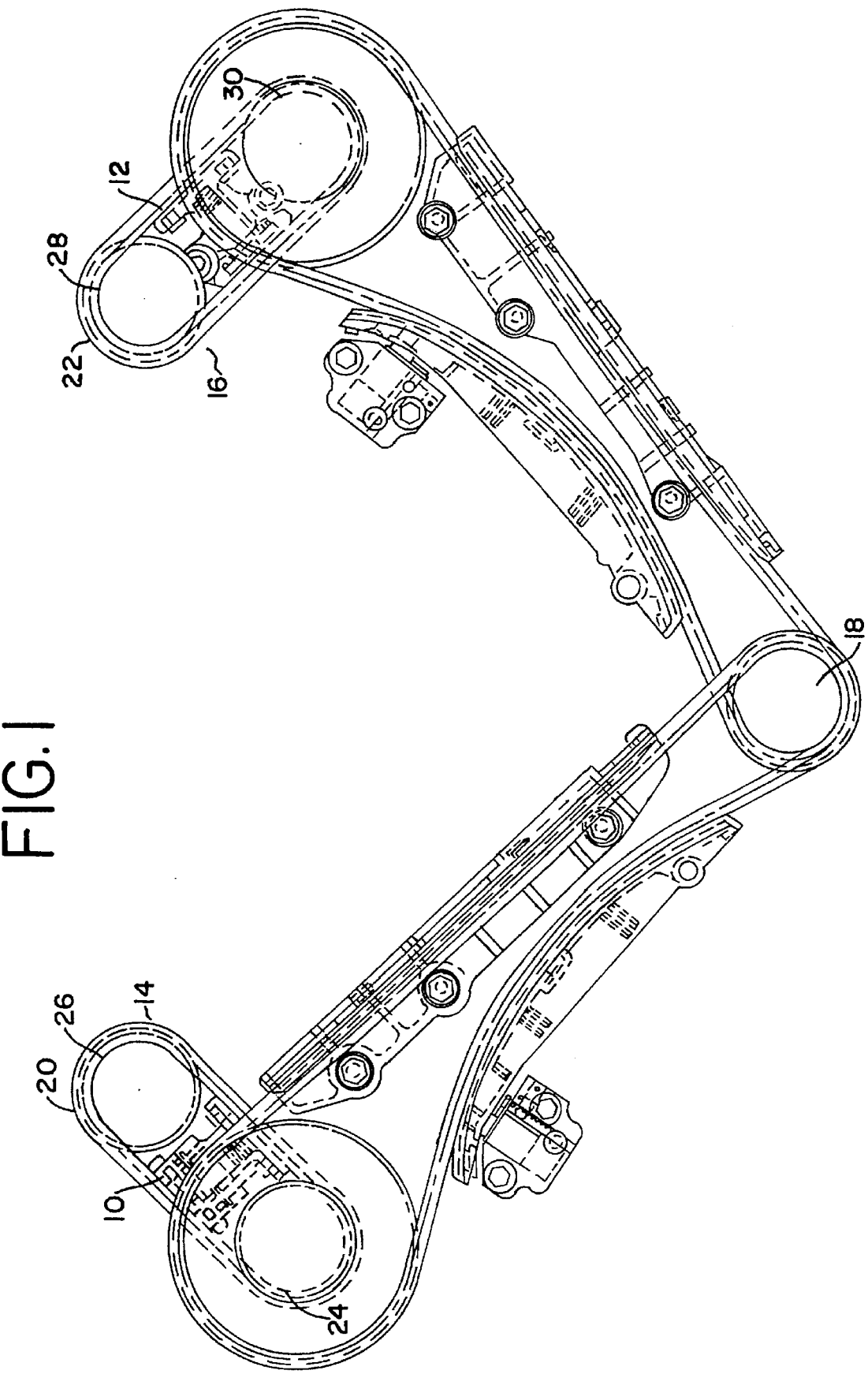

HYDRAULIC TENSIONER WITH CHECK VALVE VENT

Reference is made to co-pending U.S. patent application Ser. No. 08/569,934 entitled "Hydraulic Tensioner With Sealing Element" and filed Dec. 8, 1995, which is owned by the assignee of the present application and which is incorporated herein by reference.

BACKGROUND OF THE INVENTION

This invention relates generally to a hydraulic tensioner having a piston longitudinally movable in a housing and more particularly to a check valve seat for such a tensioner with a vent path on the bottom surface of the check valve seat. This invention also relates to a tensioner whose components are made from anodized aluminum.

Tensioning devices, such as hydraulic tensioners, are used as a control device for power transmission chains as the chain travels between a plurality of sprockets. In an automotive application, the tension of the chain can vary greatly due to the wide variation in the temperature and the linear expansion among the various parts of the engine. Moreover, wear to the chain components during prolonged use can produce a decrease in the tension of the chain. As a result, it is important to impart and maintain a certain degree of tension to the chain to prevent noise, slippage, or un-meshing of the chain teeth. It is especially important in the case of a chain-driven camshaft in an internal combustion engine to prevent the chain from slipping because the camshaft timing can be misaligned by several degrees, possibly rendering the engine inoperative or causing damage.

A potential problem with hydraulic tensioners, however, is that the fluid pressure inside of the fluid chamber formed between the hollow piston and the bore in the housing may change due to the introduction of air into the fluid chamber. If an excessive amount of air is present on the chamber, the piston will easily move due to the compressibility of the air. As a result, the proper functioning of the tensioner will not be achieved. It is, therefore, desirable to provide for venting of air from the hydraulic fluid chamber.

Venting involves allowing air to escape from the high pressure chamber in the piston. One method for venting air is disclosed in U.S. Pat. No. 4,507,103, where a plug having a groove machined onto its flank is pressed into a smooth bore at the top of the piston so that a connection exists between the atmosphere and the fluid reservoir. A drawback to this method is that the plug and groove must be properly machined to fit into the smooth bore and to provide a suitable connection.

Another method for venting air is disclosed in U.S. Pat. No. 5,346,436, where the air vent is a disc having at least one channel on at least one surface to provide a connection between the atmosphere and the fluid reservoir. The method of venting air disclosed in 5,346,436, however, refers to a primary tensioner where the piston protrudes upward, and the air vent, therefore, is at the top of the piston.

The present invention is directed toward a secondary tensioner where the tensioner may be placed in a variety of orientations, including one in which the piston extends down when extending out from the bore. In such a secondary tensioner, an air vent at the top of the piston will not assist in the venting of air. The check valve vent of the present invention is a simple and inexpensive apparatus to provide both an air vent for a secondary hydraulic tensioner and a pliable seat for a check valve. The check valve assembly sits within the seat of the check valve vent, which has a tortuous air vent path at the bottom. In this way, the seat allows the check valve to seal effectively against back pressure, while at the same time air trapped in the piston can vent along the tortuous path.

Another problem common to hydraulic tensioners is the fit between the piston and the bore. While the gap between piston and bore must be kept small to minimize fluid leakage, the piston can often stick to the bore and not slide properly. A hydraulic tensioner having an aluminum piston sliding in an aluminum housing often will not perform properly because of sticking between the components. Moreover, the aluminum components are extremely susceptible to wear and microscopic friction welding. It is, therefore, desirable to prevent the aluminum components from sticking and to protect them from wear.

SUMMARY OF THE INVENTION

The present invention is directed to a secondary hydraulic tensioner having a check valve vent. The secondary tensioner includes a housing having a bore and a hollow piston slidably received within the bore to form a fluid filled chamber. The piston is biased in a protruding direction by a spring. A check valve assembly is provided to permit the flow of fluid from an external source through the valve and into the fluid chamber. A seat portion surrounds the check valve assembly and provides a pliable seat for the check valve. Using a pliable seat simplifies manufacturing because it eliminates the need to provide very flat mating surfaces, as well as the need for a press fit. The check valve seat is positioned against the inlet from the external source of fluid into the chamber, thereby allowing the check valve to seal against back pressure which is necessary to prevent backflow from the high pressure tensioner into the reservoir or oil supply. Excessive leakage past the check valve adversely affects the performance of the hydraulic chain tensioner. The check valve seat eliminates leakage past the check valve by conforming to it.

The tensioner of the present invention in its preferred embodiment is a secondary tensioner. That is, it is typically utilized in a camshaft-to-camshaft chain drive of a dual overhead camshaft engine. A secondary tensioner may be mounted in a variety of orientations, including upside down, i.e., the piston extends downward when extending out from the bore. The check valve vent, being at the bottom of the piston, allows for venting of the tensioner through the bottom of the piston.

In a preferred embodiment of the tensioner, the seat portion surrounding the check valve includes an air vent path along the inlet side of the valve. The air vent path is a tortuous path located at the bottom of the check valve seat. Any air trapped in the piston chamber can vent around the tortuous path.

In a second preferred embodiment, the piston and the housing of a secondary tensioner which incorporates the check valve vent of the present invention are made of aluminum. By manufacturing both components of aluminum, the thermal expansion of the components is the same. This allows the clearance between the piston and the housing to remain essentially constant at any temperature. This clearance is used to control the amount of oil flow from the high pressure chamber of the tensioner. The oil flow is calibrated for an application to provide correct tensioner response to the cam drive loads. Moreover, the use of aluminum in tensioner components allows many tensioner features to be produced by molding methods rather than machining.

In this preferred embodiment, the piston is formed of anodized aluminum. Anodizing is a process that is used to provide corrosion-resistant finishes to aluminum. Anodizing increases the thickness of the highly protective, but thin, aluminum oxide layer that normally exists on aluminum and helps prevents excessive component wear and galling which would render the tensioner non-functional. Alternatively, both the piston and the housing are formed of anodized aluminum. Anodizing the piston, or the piston along with the housing, provides a protective layer that minimizes wear, sticking, and microscopic friction welding.

The foregoing and other features and advantages of the present invention will become apparent from the following detailed description of the presently preferred embodiments and the accompanying drawings.

BRIEF DESCRIPTION OF THE DRAWINGS

FIG. 1 is a schematic illustrating a timing chain system with dual overhead camshafts and a camshaft-to-camshaft drive system.

DETAILED DESCRIPTION OF THE INVENTION AND PRESENTLY PREFERRED EMBODIMENTS

Turning now to the drawings, FIG. 1 illustrates two hydraulic tensioners 10 and 12 positioned in opposite directions in a timing chain system with dual overhead camshafts 14 and 16 and crankshaft-to-camshaft drive systems driven by a crankshaft 18. Chains 20 and 22 are wrapped about sprockets 24, 26, 28 and 30 of the camshafts. The tensioners 10 and 12 are provided to maintain chain tension in the camshaft-to-camshaft drive system.

Figure 3:
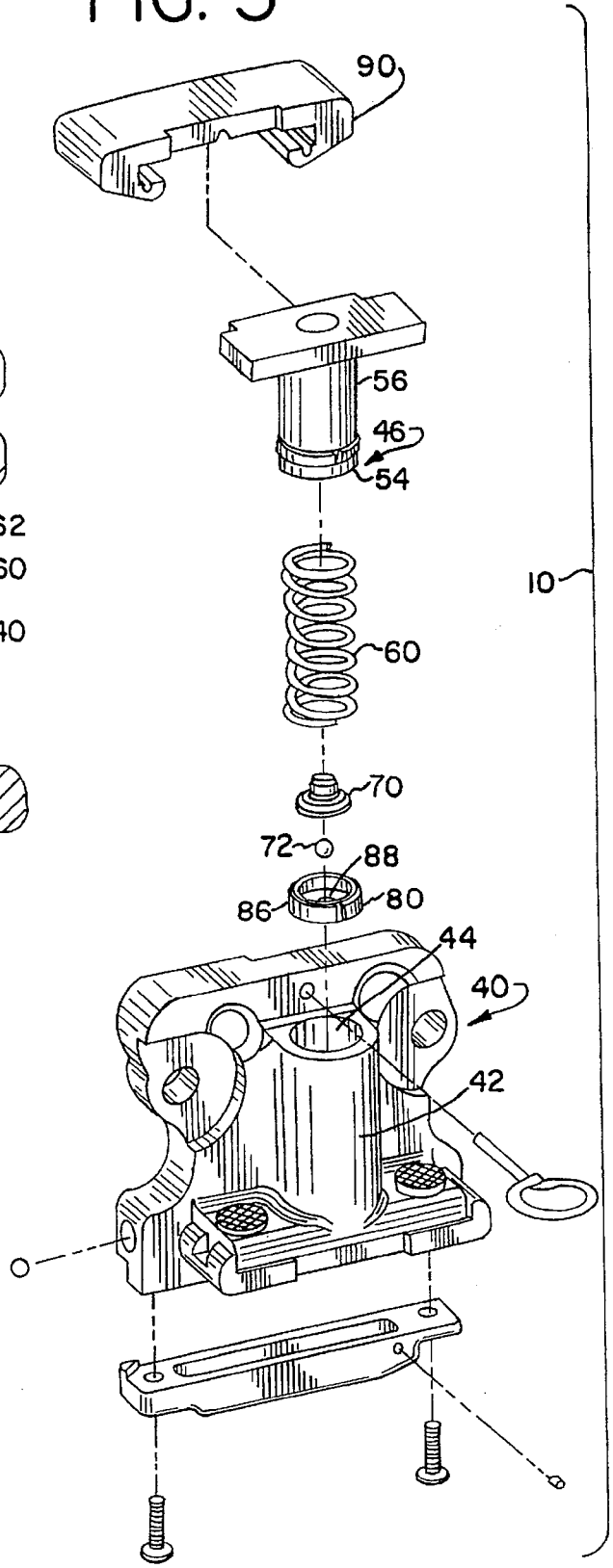
FIG. 3 is an exploded view of a hydraulic tensioner incorporating the check valve vent of the present invention.
Figure 2:
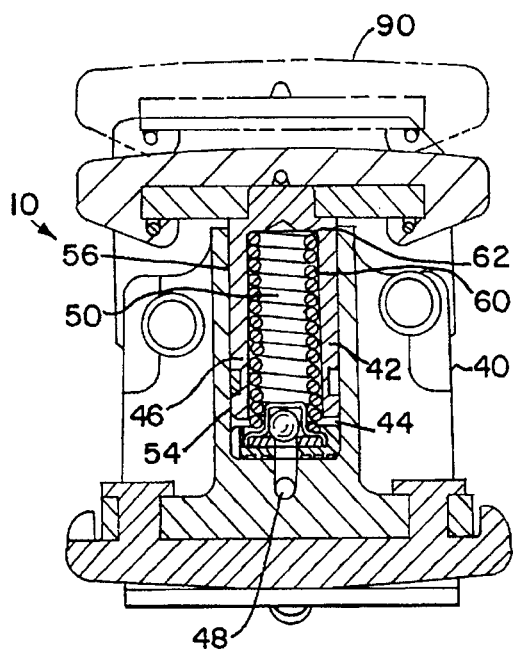
FIG. 2 is a sectional view of a hydraulic tensioner incorporating the check valve vent of the present invention.

Referring more particularly to FIGS. 2 and 3, a hydraulic tensioner 10 (or 12) of FIG. 1 is shown in an inverted position for the ease of the viewer. FIG. 2 illustrates one preferred embodiment of the hydraulic chain tensioner 10 incorporating the check valve vent of the present invention. The tensioner 10 includes a housing 40 having a bore 42, which forms a fluid chamber 44 with a hollow piston 46. The chamber 44 is filled with fluid through a passageway 48 from a pressure fluid source (not shown). The fluid source may be an oil pump, oil reservoir, or the like. Fluid enters the chamber 44 formed by the bore 42 and hollow piston 46, as described below. Preferably, the chamber is a cylindrical bore. The chamber 44 slidably receives the hollow piston 46, preferably cylindrical, having an interior space 50, a lower end 54, an upper end 56. The lower end 54 is positioned inside the chamber 44. The upper end 56 contacts the tensioner face 90. The tensioner face 90 provides tension along a chain/belt (not shown). A spring 60 contacts the inside 62 of the upper end 56 of the piston 46 to bias the piston in a protruding or outward direction.

As noted above, the housing 40 is provided with a passageway 48 at the bottom of the chamber 44 to connect the chamber with a source of fluid pressure. The source of fluid pressure may be a reservoir, oil pump, or the like. One embodiment of the secondary tensioner includes a check valve 70 that is provided between the chamber 44 and the passageway 48, and thus the source of fluid pressure, to permit fluid flow into the chamber while blocking fluid flow in the reverse direction.

Figure 4:
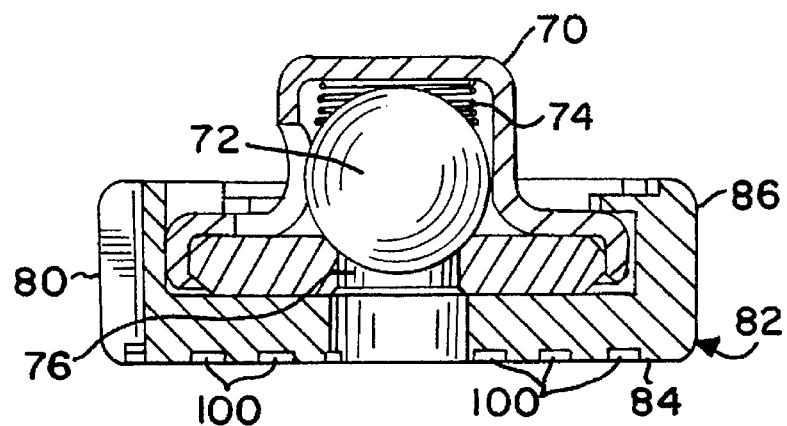
FIG. 4 is a side view of the check valve vent assembly and the check valve seat of the present invention.

FIG. 4 illustrates the check valve 70 and the check valve vent 80 of the present invention. Preferably, the check valve 70 includes a ball 72 and a spring 74 biasing the ball toward a ball seat 76. In another embodiment, the check valve may be a variable orifice check valve as shown and described in U.S. Pat. Nos. 5,258,820 and 5,277,664, both of which are owned by the assignee of the present application and both of which are incorporated herein by reference.

Figure 5:
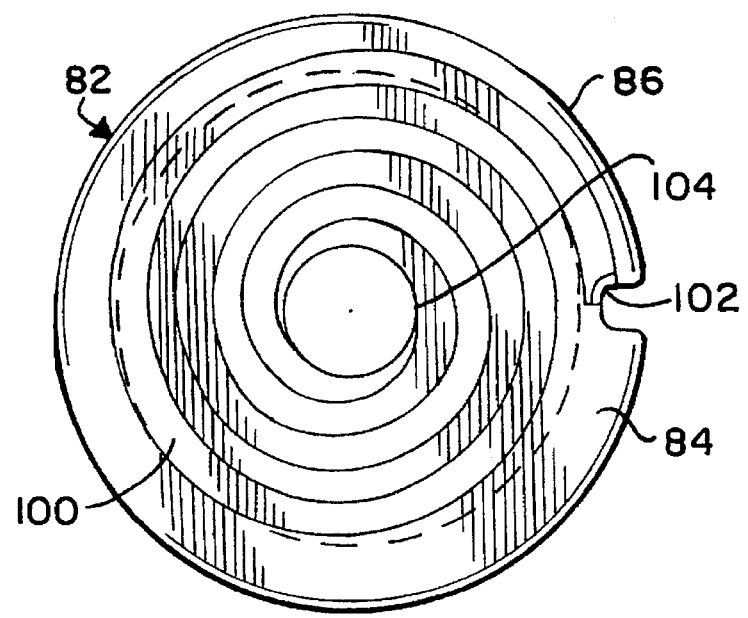
FIG. 5 is a view of the tortuous air path on the bottom of the check valve seat of the present invention.

In one preferred embodiment, as shown in FIGS. 3–5, the check valve vent 80 of the present invention includes a disc 82 having a first surface 84 and an outer periphery 86 extending upward from the first surface leaving a hollow inner portion 88. Preferably, the disc is circular and has an inner diameter slightly larger than the outer diameter of the check valve 70 so that the check valve can sit within the hollow portion 88 of the check valve vent. In this manner, the check valve vent acts as a seat for the check valve. The first surface 84 is formed with at least one channel 100 with each having a first end 102 and a second end 104. The first end 102 terminates at the outer periphery 86. The second end 104 preferably terminates at the approximate center point of the disc.

Referring more particularly to FIG. 5, a bottom view of the check valve vent of the present invention is shown. In this embodiment, the vent is a disc 82 having an air vent path in the shape of a single tortuous channel 100 provided on the bottom of the first surface 84 of the disc 82. The first end of the channel 102 is cut out from the periphery 86 of the disc. The channel path is in the shape of a spiral that is curved at least ninety degrees and extends from the periphery to the approximate center point of the disc with the second end 104 terminating at about the center point of the disc.

The air vent path of the check valve vent of the present invention is not limited to a single channel having a tortuous shape. Other embodiments are shown and described in U.S. Pat. No. 5,346,436, which is owned by the assignee of the present application and which is incorporated herein by reference.

At engine start-up, the high pressure fluid opens the check valve and flows into the chamber formed by the hollow interior of the piston and the bore of the housing. As the fluid fills the chamber, the piston is moved outward by the force of the pressurized fluid and the spring. The piston continues to move outward until the inward force of the chain on the piston balances the outward force of the spring and fluid. At this point, the ball check valve closes and prevents further fluid flow.

When the piston is being stressed inward by tightening of the chain, a very hard resistance can be noticed since the piston is completely filled with an incompressible fluid. In the case of sufficiently high pressure, overflow fluid flows to the first end of the tortuous channel of the air vent path and through the channel to the second end. Together with this overflow fluid, air is pushed out that, during the operation of the tensioner, may have accumulated in the chamber so that a continuous venting of the chamber occurs. Because the viscosity of air is relatively lower than the viscosity of the fluid, the air flows through the tortuous path easily, while the fluid flow is restricted, thus preventing excess leakage from the high pressure chamber to the oil inlet. At the same time the check valve vent allows air to exit, the check valve seals against back pressure and prevents outflow of fluid into the reservoir.

In a second preferred embodiment, the piston 46 and the housing 40 of a secondary tensioner incorporating the check valve vent of the present invention are formed of aluminum. More particularly, the piston 46 is formed of anodized aluminum. In the alternative, both the piston and the housing may be formed of anodized aluminum. Anodizing the piston or, alternatively, the piston and the housing, prevents the components from sticking when the piston slides inside the bore.

Those skilled in the art to which the invention pertains may make modifications and other embodiments employing the principles of this invention without departing from its spirit or essential characteristics, particularly upon considering the foregoing teachings. The described embodiments are to be considered in all respects only as illustrative and not restrictive and the scope of the invention is, therefore, indicated by the appended claims rather than by the foregoing description. Consequently, while the invention has been described with reference to particular embodiments, modifications of structure, sequence, materials and the like would be apparent to those skilled in the art, yet still fall within the scope of the invention.

What is claimed is:

1. A hydraulic chain tensioner comprising:

a housing having a generally cylindrical bore;

a hollow piston slidably received within said bore to define a fluid chamber with said bore;

a spring biasing the piston in the protruding direction from said bore; and a check valve to permit the flow of hydraulic fluid from an external source of hydraulic fluid through a valve inlet and into the fluid chamber and prevent flow in the reverse direction, said check valve including a disc portion, said disc portion being positioned against the inlet from said external source of fluid into said chamber, said disc portion having at least one channel formed on the surface of said disc positioned against said inlet and at least one channel formed along the periphery of said disc, said surface channel and said periphery channel establishing a connection between said fluid chamber and said valve inlet.

2. The hydraulic tensioner of claim 1 wherein said check valve includes a ball and a seat, said disc portion completely encompassing said seat portion in said bore.

3. The hydraulic tensioner of claim 1 wherein said periphery channel and said surface channel provide an air vent path for the passage of air from said fluid chamber to said valve inlet when said check valve is closed.

4. A hydraulic chain tensioner comprising:

a housing having a generally cylindrical bore;

a hollow piston slidably received within said bore to define a fluid chamber with said bore;

a spring biasing the piston in the protruding direction from said bore; and a check valve to permit the flow of fluid from an external source through the valve and into the fluid chamber, said piston being formed of anodized aluminum.

5. The hydraulic chain tensioner of claim 4 wherein said bore is formed of anodized aluminum.

6. A hydraulic chain tensioner comprising:

a housing having a generally cylindrical bore;

a hollow piston slidably received within said bore to define a fluid chamber with said bore;

a spring biasing the piston in the protruding direction from said bore; and a check valve to permit the flow of hydraulic fluid from an external source of hydraulic fluid through a valve inlet and into the fluid chamber and prevent flow in the reverse direction, said check valve including a disc portion, said disc portion being positioned against the inlet from said external source of fluid into said chamber, said piston being formed of anodized aluminum.

7. The hydraulic chain tensioner of claim 6 wherein said housing is formed of anodized aluminum.

8. A hydraulic chain tensioner comprising:

a housing having a generally cylindrical bore;

a hollow piston slidably received within said bore to define a fluid chamber with said bore;

a piston spring biasing said piston in a protruding direction from said bore, said piston having a protruding end extending in said protruding direction;

said fluid chamber having a first end closest to said protruding end of said piston and a second end opposite said first end;

said fluid chamber second end having an orifice in connection with an external source of fluid;

a vent member positioned in said fluid chamber second end, said vent member having an outer peripheral surface, a passage connecting said fluid chamber to said external source of fluid, and at least one channel having a first end extending from said passage to a second end terminating at said outer peripheral surface.

9. The hydraulic chain tensioner of claim 8, further comprising:

a check valve engaged with said orifice to permit the flow of fluid from said external source of fluid through said valve and into said fluid chamber, and to prevent fluid flow in the reverse direction;

said check valve having an outer periphery;

said vent member having an inner surface in contact with said check valve outer periphery such that a seal is formed between said vent member inner surface and said check valve outer periphery.

10. The hydraulic chain tensioner of claim 8, said piston being formed of anodized aluminum.

* * * * *